United States Patent [19]
Kersten

[11] 3,866,422
[45] Feb. 18, 1975

[54] HYDRAULIC DRIVE
[75] Inventor: Günter Kersten, Stuttgart, Germany
[73] Assignee: Robert Bosch GmbH, Stuttgart, Germany
[22] Filed: Jan. 9, 1974
[21] Appl. No.: 431,963

[30] Foreign Application Priority Data
Jan. 13, 1973 Germany.............................. 2301612

[52] U.S. Cl.................................. 60/456, 60/DIG. 5
[51] Int. Cl............................................ F15b 21/04
[58] Field of Search ......... 60/456, 468, 477, DIG. 5

[56] References Cited
UNITED STATES PATENTS
| | | | |
|---|---|---|---|
| 2,961,829 | 11/1960 | Weisenbach...................... | 60/456 X |
| 3,236,049 | 2/1966 | Reinke........................... | 60/456 UX |
| 3,522,704 | 8/1970 | Martin............................. | 60/456 X |

Primary Examiner—Edgar W. Geoghegan
Attorney, Agent, or Firm—Michael S. Striker

[57] ABSTRACT
A hydraulic drive in which a first and second hydraulic unit are connected in a closed circuit by two main conduits, and in which one of the units may be operated as pump and the other as hydraulic motor, so that one of the main conduits through which fluid flows from the pump to the motor is a high-pressure line and the other a low-pressure line. The drive includes further a flushing valve and a precontrolled pressure limiting valve operated upon occurrence of an overpressure in the high-pressure line to establish a first connection between the high-pressure line and the low-pressure line and over the flushing valve a second connection between the high-pressure line and a container from where the fluid is fed in cooled condition into the low-pressure line.

7 Claims, 1 Drawing Figure

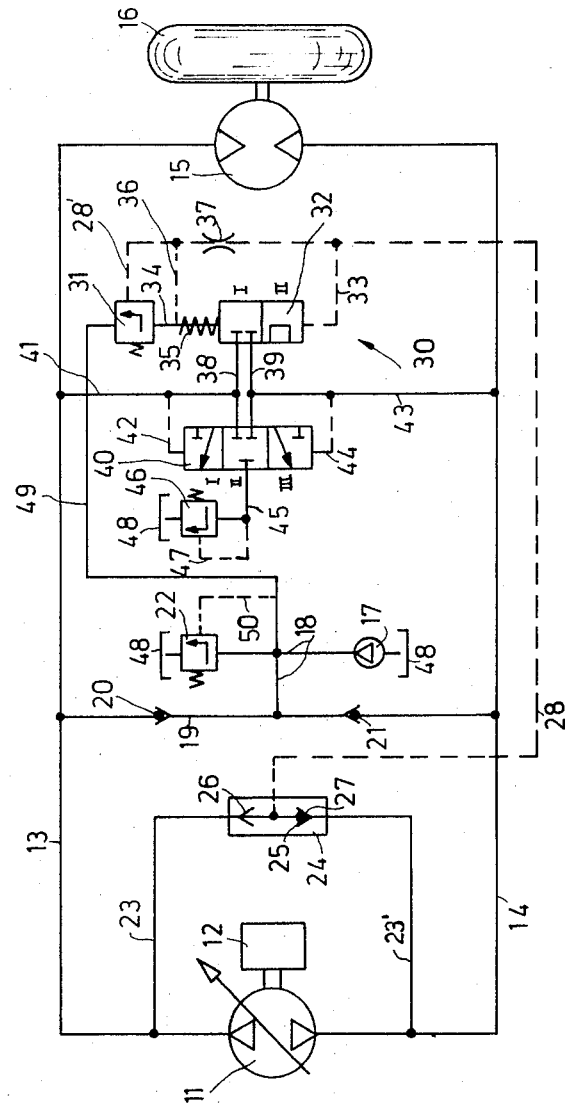

HYDRAULIC DRIVE

BACKGROUND OF THE INVENTION

The present invention relates to a hydraulic drive in which a first and a second hydraulic unit are connected in a closed circuit by two main conduits, and in which one of the units may be operated as a pump and the other as a hydraulic motor, so that one of the main conduits through which the fluid flows from the pump to the motor is a high-pressure line and the other a low-pressure line. The closed circuit is protected by valves against overpressure and provided with a feed pump which, over non-return valves and a flushing valve controlled from the pressure in the high-pressure line, feeds pressure fluid in the respective low-pressure line.

Which of the two main conduits will be the high-pressure line and which will be the low-pressure line will depend on whether the first or the second hydraulic unit operates as a pressure-producing unit or whether the pump will be reversed.

In a known hydraulic drive of the above-described type there are provided two overpressure valves connected to the two main conduits intermediate the two hydraulic units and which are constructed in such a manner that when one of the main conduits is a high-pressure line, flow of fluid from this high-pressure line will pass from the one main conduit to the other main conduit through one of the overpressure valves, whereas if the other main conduit should be the high-pressure line fluid will pass from the other to the one main conduit through the other overpressure valve, whenever an overpressure will occur in the respective high-pressure line. In this arrangement the whole pressure fluid will pass through the respective overpressure valve from the high-pressure to the low-pressure line whenever the pressure in the high-pressure line exceeds a predetermined pressure to which the overpressure valves have been adjusted. The fluid passing through the respective overpressure valve will be considerably heated through the throttle action of this valve. It will pass therefore considerably heated directly into the low pressure line. In such an arrangement, the cooled pressure fluid which is fed by the feed pump over a flushing valve into the low-pressure line will in many cases not be sufficient to limit the overall temperature of the pressure medium in such a manner that damage to the hydraulic units can be positively prevented.

SUMMARY OF THE INVENTION

It is an object of the present invention to provide a hydraulic drive of the aforementioned kind in which the temperature of the fluid medium in the closed circuit may be maintained at a relatively low temperature so that damage to the two units in the circuit is positively prevented.

It is a further object of the present invention to provide a hydraulic drive of the aforementioned kind which is simple in its construction so that it may be manufactured at a reasonable cost and will stand up properly under extended use.

With these and other objects in view, which will become apparent as the description proceeds, the hydraulic drive according to the invention mainly comprises a first hydraulic unit and a second hydraulic unit in which one of the units may be operated as pump and the other as hydraulic motor, and a pair of main conduits connecting the unit in a closed circuit so that one of the main conduits will be a high-pressure conduit and the other a low-pressure conduit. The drive includes further valve means including a flushing valve and overpressure or precontrolled pressure limiting valve means connected to the circuit so as to be operated when the pressure in the high pressure conduit exceeds a predetermined pressure to establish a first connection between the high-pressure and the low-pressure conduit and over the flushing valve means a second connection between the high-pressure conduit and a container, while a feed pump connected to the container feeds fluid therefrom into the low pressure conduit.

The pressure medium steam which flows out from the overpressure valve means is divided in this arrangement into a first partial stream which flows directly from the high-pressure conduit to the low-pressure conduit and into a second partial stream which flows over the flushing valve to the container where it is cooled and fed from there in cooled condition into the low-pressure conduit. Furthermore, in this arrangement there is only a single overpressure valve means necessary which will result in a compact construction and reduction of the manufacturing cost of the arrangement which is of a special importance in small hydraulic drives. However, even in large scale hydraulic drives the arrangement according to the present invention has found great acclaim.

The arrangement according to the present invention is especially suitable in hydraulic drives in which the hydraulic units are radial piston machines in which the rotor rotates on a stationary control trunnion. In such a machine the clearance between the trunnion and the rotor has to be very small. In the absence of the specific arrangement according to the present invention the hot pressure medium which flows from the low-pressure line to the control trunnion would heat the latter to such an extent that the clearance between control trunnion and rotor would be excessively reduced so that damage could occur to the respective hydraulic unit due to increased friction between rotor and trunnion. Since the hydraulic drive according to the present invention can be manufactured at very reasonable cost, it may advantageously be used in connection with all types of hydraulic machines.

The hydraulic drive according to the present invention is especially suitable in the drive of automobile vehicles. It will properly function not only during normal forward drive of the vehicle, but also during reverse drive as well as during operation of the vehicle on a downwardly inclined slope in which it is driven by its own mass.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing schematically illustrates the hydraulic drive according to the invention.

DESCRIPTION OF THE PREFERRED EMBODIMENT

The hydraulic drive schematically illustrated in the single drawing includes an adjustable hydraulic pump 11 (first hydraulic unit) which is driven from a prime mover 12, which may for instance be the motor of an automotive vehicle. The pump 11 is connected by means of two main conduits 13 and 14 with a hydraulic motor 15 (second hydraulic unit) which, for instance, may drive a wheel 16 of the vehicle. The arrangement includes further a feed pump 17 which may likewise be driven from the prime mover 12.

A conduit 18 leads from the feed pump 17 to a conduit 19 which in turn connects the two main conduits 13 and 14 with each other. A pair of non-return valves or check valves 20 and 21 are arranged in the conduit 19 respectively at opposite sides from the point at which the conduit 18 is connected to the conduit 19. The non-return valves 20 and 21 are constructed in such a manner as to permit flow of fluid only from the aforementioned point to the main conduits 13 and 14, respectively. A feed pressure limiting valve 22 is conected to the conduit 18.

A bypass conduit 23 is connected at opposite ends respectively to the main conduits 13 and 14 adjacent the pump 11 and a changeover valve 24 is arranged in this bypass conduit. The changeover valve corresponds in principle to a double check valve having two spaced valve seats 26 and 27 facing each other and a valve member 25 movable between the two valve seats to engage one or the other of the same. A control conduit 28 is connected to a portion of the bypass conduit 23 which is located between the valve seats 26 and 27 and the control conduit 28 leads from the aforementioned portion of the conduit 23 to a precontrolled pressure limiting valve 30. This pressure limiting valve 30 comprises a control valve 31 and a main valve 32 which is shiftable between two valve positions I and II.

The control conduit 28 is provided with a branch conduit 33 which leads to one end of the main valve 32 and the other end of the main valve is connected by a conduit 34 with the control valve 31. A spring 35 acts on the other end of the main valve 32. A further control conduit 36 is connected at one end to the conduit 34 and at the other end to the control conduit 28. From the point at which the control conduit 36 is connected to the control conduit 28, the control conduit 28 is extended by means of a control conduit 28' which leads to the control valve 31. Between the points at which the control conduits 33 and 36 communicate with the control conduit 28 a throttle 37 is arranged.

Two parallel conduits 38 and 39 lead from the main valve 32 of the precontrolled pressure limiting valve 30 to a flushing valve 40. The flushing valve 40 is a three-position valve shiftable between three positions I, II and III. A conduit 41 connects the conduit 38 with the main conduit 13 and a control conduit 42 leads from the conduit 41 to one end face of the flushing valve 40. A conduit 43 connects the conduit 39 with the main conduit 14. A control conduit 44 leads from the conduit 43 to the other end of the flushing valve 40. A conduit 45 leads from the flushing valve 40 to a pressure holding valve 46. The pressure holding valve 46 is connected to the conduit 45 through a control conduit 47.

A conduit 49 leads from the control valve 31 to the conduit 18. The feed pressure limiting valve 22 is acted upon by pressure fluid from the conduit 49 through a control conduit 50 leading from the conduit 49 to the valve 22. The two valves 22 and 46 are normally held in closed position by springs schematically shown in the drawing and these valves will open when the pressure of the fluid in the respective control conduits 50 and 47 exceeds the pressure of the springs so that the valves will discharge pressure fluid into a container 48 from which the feed pump 17 feeds pressure fluid into the conduit 18. While in the drawing three separate containers 48 are schematically indicated, it is pointed out that this showing of three separate containers is made for simplification reasons, but in fact the two valves 22 and 46 discharge, when opened, into the same container from which the feed pump sucks up fluid.

The above-described hydraulic drive will operate as follows:

Assuming that the pump 11 feeds the pressure medium into the main conduit 13, then the latter will be the high pressure conduit. The fluid motor 15 is driven through the pressure medium passing through the main conduit 13. As the pressure medium passes through the hydraulic motor 15 to drive the latter, its pressure is reduced and the fluid medium at reduced pressure flows through the main conduit 14 back to the pump 11. The main conduit 14 is therefore the low pressure conduit. The feed pump 17 feeds over the conduits 18 and 19 and the one-way valve 21, which opens when the feed pump is operated, cool pressure fluid from the container 48 into the low pressure conduit 14. The one-way valve 20 remains closed, due to the high pressure of the fluid medium in the main conduit 13, which is higher than the pressure of the fluid medium pumped from the feed pump 17. The pressure in the main conduit 13 acts on the flushing valve 40 through the conduit 41 and the control conduit 42 in such a manner so as to move the flushing valve to the position I. Therefore a part of the hot fluid medium passing through the main conduit 14 may pass through the conduits 43 and 39 through the flushing valve 40 and the pressure holding valve 46 to the container 48. The pressure holding valve 46 is adjusted to open at a relatively low pressure, for instance 8 bar.

The high pressure in the main conduit 13 presses the valve member 25 of the change-over valve 25 onto its seat 27. Pressure medium will therefore flow from the main conduit 13 over the conduits 23 and 28 to the precontrolled pressure limiting valve 30. When the pressure in the main conduit 13 surpasses the predetermined value to which the control valve 31 is adjusted, the latter will open so that pressure medium will flow through the conduits 36 and 34 and the conduits 49 and 18 and the check valve 21 to the main conduit 14 in which a low pressure is maintained. This means that the pressure on the side of the main valve 32 which is engaged by the spring 35 will be reduced so that the main valve will be shifted against the spring force, due to the pressure in the control conduit 33, into its position II. In this position the main valve 32 will connect the right ends, as viewed in the drawing, of the conduits 38 and 39 to each other so that fluid may flow from the main conduit 13 through the conduits 41 and 38, the main valve 32, and the conduits 39 and 43 to the low pressure conduit 14, whereas another part of the fluid will flow from the main conduit 13 through the conduits 14 and 38, the main valve 32 and the conduit 39 into the flushing valve 40, which is in the position I so that the fluid passes from the flushing valve through the open pressure holding valve 46 into the container 48 from where it is fed in cool condition by the feed pump 17 into the low pressure conduit 14. Therefore, in the arrangement according to the present invention it is evident that not the total flow of fluid passing through the precontrolled pressure limiting valve 30 will be passed directly into the low pressure conduit 14, which would result in an excessive increase of the temperature of the fluid passing through this conduit.

The throttle 37 in the conduit 28 has the purpose of assuring, together with the spring 35, a certain control function for the main valve 32. When the overpressure in the main conduit 13 is again reduced the control valve 31 will close so that the main valve 32 will again be returned to its closed position I.

If the hydraulic drive is used in a motor vehicle and the latter passes over a downwardly inclined slope so as to be driven by its own mass, or if the direction of the pump 11 is reversed, the pressure medium will be pumped into the main conduit 14 and the latter will be the high-pressure conduit, whereas the main conduit 13 will be the low-pressure conduit. Under these conditions, the flushing valve 40 will be moved due to the pressure in the conduit 43 and the control conduit 44 into its position III. Since the pressure in the main conduit 14 is higher than the pressure in the main conduit 13, the check valve 21 will be closed, whereas the check valve 20 will be opened so that the feed pump 17 will pump fluid from the container 48 through the ckeck valve 20 into the main conduit 13. Fluid fed in excess by the feed pump 17 may flow through the conduits 41, 38 and the flushing valve 40 and the pressure holding valve 46 to the container 48. The pressure in the conduit 23' presses the valve member 25 onto the seat 26 so that pressure medium from the high-pressure main conduit 14 may flow again through the conduit 23' into the control conduit 28. If now an undue high pressure develops in the main conduit 14, the control valve 31 will again open to thereby permit movement of the main valve 32 in its position II, whereafter the above-described operation will be repeated.

With the hydraulic drive according to the present invention it is possible to omit one of the two overpressure valves necessary in the arrangements of the prior art. Furthermore, the hot pressure medium leaving the main valve 32 will be divided in two partial streams, one flowing directly from the high pressure conduit to the low pressure conduit, whereas the other passes through the flushing valve 40 and the pressure holding valve 46 into the container 48 from where it will be fed in cooled condition into the low pressure conduit. In this way feeding the total heated pressure medium directly into the low pressure conduit is avoided.

It will be understood that each of the elements described above, or two or more together, may also find a useful application in other types of hydraulic drives differing from the types described above.

While the invention has been illustrated and described as embodied in a hydraulic drive in which overheating of the fluid medium passing therethrough is prevented, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. A hydraulic drive comprising a first hydraulic unit and a second hydraulic unit, one of said units being operated as pump and the other as hydraulic motor; a pair of main conduits connecting said units in a closed circuit, one of said main conduits being a high-pressure conduit and the other a low-pressure conduit; overpressure means including a flushing valve and pressure limiting valve means connected to said circuit so as to be operated with the pressure in said high-pressure conduit exceeds a predetermined pressure to establish a first connection between said high-pressure and said low-pressure conduit and over said flushing valve a second connection between said high-pressure conduit and a container; and a feed pump for feeding fluid from said container into said low pressure conduit.

2. A hydraulic drive as defined in claim 1, wherein said feed pump feeds fluid from said container to a point of said low-pressure conduit between said first and second unit and wherein said first connection communicates with said low-pressure conduit between said point and said second unit.

3. A hydraulic drive as defined in claim 2, including a conduit communicating at opposite ends with said pair of main conduits, a change-over valve in said conduit including a pair of spaced valve seats in said conduit facing each other and a valve member movably arranged between said valve seats, and a control conduit communicating at opposite ends with said conduit between said valve seats and said overpressure valve means.

4. A hydraulic drive as defined in claim 3, wherein said pressure limiting valve means comprises an overpressure control valve connected to said control conduit and opening when the pressure in said high-pressure conduit exceeds said predetermined pressure and a main valve normally held in a first position and movable from said first to a second position upon opening of said overpressure control valve, said flushing valve being a three-position valve, two conduits connecting said flushing valve with said main valve, and a third conduit connecting said flushing valve with said container, and two further conduits respectively connecting said two conduits with said main conduits, said main valve connecting in said second position said two conduits to each other so that a first stream of fluid may pass through said two further conduits from the high-pressure conduit directly to the low-pressure conduit, while a second stream of fluid will pass from said high-pressure conduit through said flushing valve into said container to be passed from there in cooled condition through said feed pump into said low-pressure conduit.

5. A hydraulic drive as defined in claim 4, and including a pressure holding valve between said flushing valve and said container.

6. A hydraulic drive as defined in claim 1 and including a connecting conduit connecting said main conduits intermediate said first and second units to each other, a pair of oppositely directed check valves in said connecting conduit, said feed pump being connected to a point of said connecting conduit located between said check valves.

7. A hydraulic drive as defined in claim 1, wherein said hydraulic drive is used in a motor vehicle, and including a motor connected to one of said units for driving the same, and a wheel connected to the other of said units.

* * * * *